(12) United States Patent
Trivedi

(10) Patent No.: US 11,902,165 B2
(45) Date of Patent: Feb. 13, 2024

(54) TRAFFIC PATTERN IDENTIFICATION AND NETWORK RESOURCE MANAGEMENT METHOD AND APPARATUS

(71) Applicant: RAKUTEN MOBILE, INC., Tokyo (JP)

(72) Inventor: Siddhartha Trivedi, Tokyo (JP)

(73) Assignee: RAKUTEN MOBILE, INC., Tokyo (JP)

(*) Notice: Subject to any disclaimer, the term of this patent is extended or adjusted under 35 U.S.C. 154(b) by 0 days.

(21) Appl. No.: 17/457,020

(22) Filed: Nov. 30, 2021

(65) Prior Publication Data
US 2023/0054272 A1 Feb. 23, 2023

Related U.S. Application Data

(60) Provisional application No. 63/234,710, filed on Aug. 19, 2021.

(51) Int. Cl.
*H04L 47/127* (2022.01)
*H04L 47/2425* (2022.01)
*H04L 47/2416* (2022.01)
*H04L 47/22* (2022.01)

(52) U.S. Cl.
CPC .......... *H04L 47/127* (2013.01); *H04L 47/22* (2013.01); *H04L 47/2416* (2013.01); *H04L 47/2425* (2013.01)

(58) Field of Classification Search
CPC ... H04L 47/22; H04L 47/127; H04L 47/2416; H04L 47/2425; H04L 41/0803; G06F 15/167; H04W 28/0268; H04W 24/08; H04W 88/08; H04W 16/18; H04W 4/24; H04W 4/021; H04M 15/8033
USPC ........................................................ 709/224
See application file for complete search history.

(56) References Cited

U.S. PATENT DOCUMENTS

| | | | |
|---|---|---|---|
| 2012/0115433 A1* | 5/2012 | Young | H04W 4/24 455/406 |
| 2014/0169192 A1* | 6/2014 | Zhang | H04W 24/08 370/252 |
| 2014/0215001 A1* | 7/2014 | Tucek | H04L 67/5681 709/213 |
| 2016/0182736 A1* | 6/2016 | Tiger | H04M 15/8214 455/406 |
| 2016/0285759 A1* | 9/2016 | Ryan | H04L 69/22 |
| 2017/0359749 A1* | 12/2017 | Dao | H04L 47/2416 |
| 2018/0218394 A1* | 8/2018 | Kerns | G06Q 30/0251 |

(Continued)

*Primary Examiner* — James N Fiorillo
(74) *Attorney, Agent, or Firm* — HAUPTMAN HAM, LLP

(57) ABSTRACT

A method includes processing first data from a network node to determine a mobile device is accessing a communication network and to identify a first traffic pattern. The method also includes causing a network device to activate the first network function based on the first traffic pattern. The method further includes processing second data from the network node to determine the communication network is no longer being accessed by the mobile device and to identify a second traffic pattern. The method additionally includes causing the network device to deactivate the first network function and to activate a second network function based on the second traffic pattern. The method also includes determining a first network resource usage and causing a charge rate to be applied for using the first network function based on the first network resource usage.

20 Claims, 3 Drawing Sheets

(56) References Cited

U.S. PATENT DOCUMENTS

| | | | |
|---|---|---|---|
| 2019/0158300 A1* | 5/2019 | Sabella | H04L 67/10 |
| 2019/0159048 A1* | 5/2019 | Feldkamp | H04L 43/08 |
| 2019/0261203 A1* | 8/2019 | Raleigh | H04W 24/08 |
| 2021/0235372 A1* | 7/2021 | Wang | H04W 28/0268 |
| 2021/0351954 A1* | 11/2021 | Mishra | H04L 12/1895 |
| 2021/0377804 A1* | 12/2021 | Sivaraj | H04W 76/15 |
| 2022/0029840 A1* | 1/2022 | Feng | H04L 12/1407 |
| 2022/0046738 A1* | 2/2022 | Challa | H04L 41/0668 |
| 2022/0141630 A1* | 5/2022 | Agarwal | H04M 15/41 |
| | | | 455/406 |
| 2022/0294489 A1* | 9/2022 | Min | H04W 4/80 |
| 2022/0312275 A1* | 9/2022 | Van Phan | H04L 43/50 |

* cited by examiner

TRAFFIC PATTERN IDENTIFICATION AND NETWORK RESOURCE MANAGEMENT METHOD AND APPARATUS

PRIORITY CLAIM AND CROSS-REFERENCE

This application claims priority to Provisional Application No. 63/234,710, filed Aug. 19, 2021, which is hereby incorporated by reference in its entirety.

BACKGROUND

Network service providers and device manufacturers (e.g., wireless, cellular, etc.) are continually challenged to deliver value and convenience to consumers by, for example, providing compelling network services that are dependable and capable of being flexibly constructed, scalable, diverse, and economically operated.

BRIEF DESCRIPTION OF DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
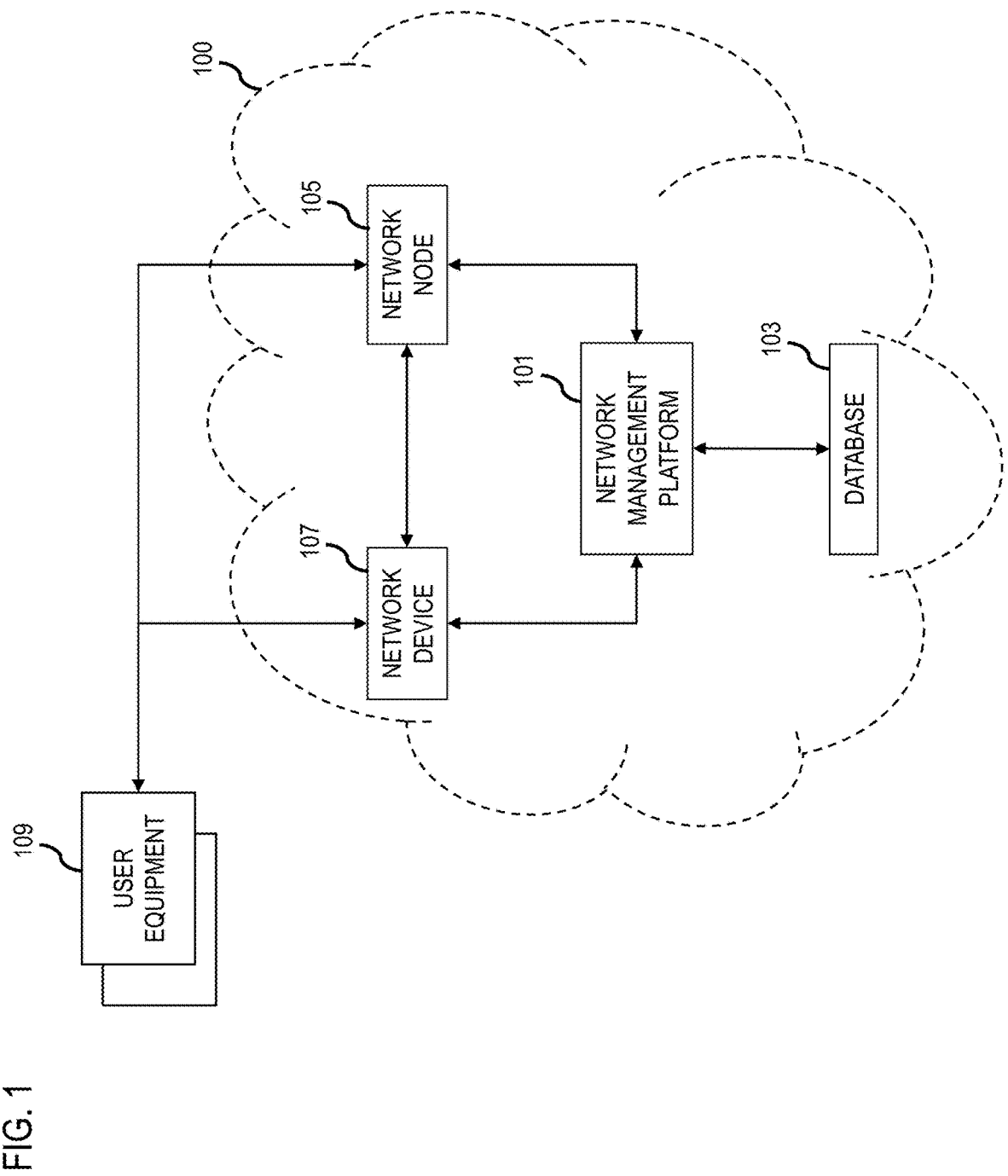
FIG. 1 is a diagram of a communication system that facilitates learning various traffic patterns, implementing network functions to improve the performance of a communication network, and managing network resource usage for implementing one or more network functions, in accordance with one or more embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation or position of a first feature over or on a second feature in the description that follows may include embodiments in which the first and second features are formed or positioned in direct contact, and may also include embodiments in which additional features may be formed or positioned between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of an apparatus or object in use or operation in addition to the orientation depicted in the figures. The apparatus may be otherwise oriented (rotated 90 degrees or at other orientations) and the spatially relative descriptors used herein may likewise be interpreted accordingly.

Network services are often provided by static or inflexible systems that are difficult to configure, scale, and deploy over various target areas. Dependable network systems and/or network services that are capable of being flexibly constructed, scalable and diverse are often dependent on automating the collection, analysis and reporting of information regarding multiple network functions, network services, network devices, etc. that affect the performance, accessibility, configuration, scale, and/or deployment of a communication network, various network functions, network services, and the like.

Network service providers sometimes recognize traffic patterns or key performance indicators (KPI's) that indicate using a network function or support package associated with a communication network improves the performance of the communication network. However, the event or traffic pattern that resulted in the improvement is in the past, having already happened. Sometimes the same event or traffic pattern may occur, or a similar event or traffic pattern may arise. Network engineers, for example, will often embark on the time consuming task of searching for a network function and apply it to the network at a given moment in an attempt to improve the performance of the communication network. However, even if a network engineer knows of a certain traffic pattern, the network engineer still needs to find some familiar network function to activate in order to attempt to improve the performance of the communication network. Barring the traffic pattern being a regular occurrence, or a network function known to be popular, timely activation of a network function that improves the performance of the communication network is difficult. Delay in improving communication network performance can result in consumer displeasure and lost sales. Moreover, always leaving a network function in an active state can sometimes increase operating costs and/or waste network resources.

FIG. 1 is a diagram of a communication system 100 that facilitates learning various traffic patterns, implementing network functions to improve the performance of a communication network, and managing network resource usage for implementing one or more network functions, in accordance with one or more embodiments.

Communication system 100 comprises a network management platform 101, a database 103, one or more network nodes 105, and one or more network devices 107.

Figure 3:
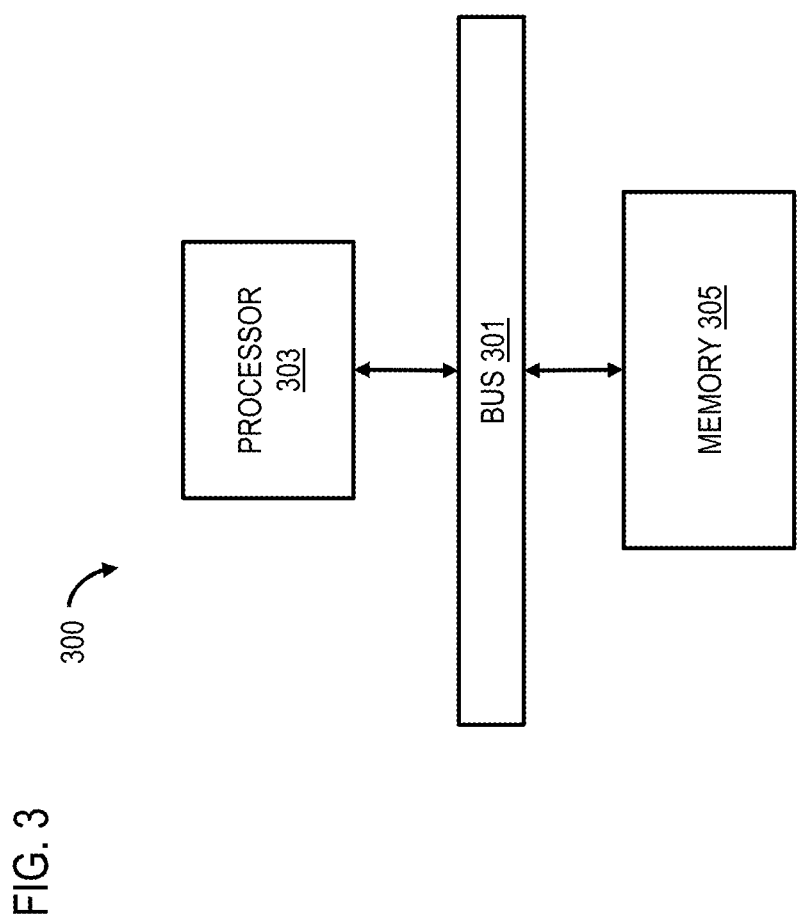
FIG. 3 is a functional block diagram of a computer or processor-based system upon which or by which some embodiments are implemented.

In some embodiments, communication system 100 corresponds to an evolved packet core (EPC) in a fourth generation mobile communication system (hereinafter, referred to as 4G) or a 5G core network (5GC) including an access and mobility management function (AMF), a session management function (SMF), a user plane function (UPF), and the like in a fifth generation mobile communication system (hereinafter, referred to as 5G). In some embodiments, one or more components of communication system 100 is implemented by a group of servers arranged in a plurality of data centers at various locations. In some embodiments, a plurality of servers are arranged in one or more of the data centers. One or more servers as described herein with respect to the various discussed embodiments is a computer or processor-based system having a processor and a memory such as that discussed with respect to computer or processor-based system 300 (FIG. 3).

In some embodiments, communication system 100 is configured to provide one or more of a voice communication service, a data communication service, an Internet-of-Things (IoT) service, or other suitable network service to user equipment 109 (UE 109) having connectivity to a communication network that is one or more of a telecommunication network, a radio communication network, a data communication network, or other suitable network provided by communication system 100. UE 109, for example, is capable of being communicatively connected with the communication network by way of network node 105 and/or network device 107. In some embodiments, the UE 109 comprises a mobile device, a mobile phone, a mobile terminal, a fixed terminal, a portable terminal including a desktop computer, a laptop computer, a notebook computer, a netbook computer, a tablet computer, wearable circuitry, a mobile handset, a server, a gaming console, a vehicle control unit, a vehicle communication unit, a smart device, some other suitable device considered as an IoT device, some other suitable device having data transmission capabilities connectivity, or a combination thereof.

Network management platform 101 is configured to analyze network traffic patterns in real time and identify the corresponding network functions implemented at a time of the identified traffic patterns, and/or cause one or more network functions to be implemented based on an occurrence of an identified traffic pattern. In some embodiments, network management platform 101 identifies a traffic pattern associated with the communication network by way of one or more of a network node 105 or a network device 107 such as a radio station, a radio frequency (RF) emitter, or other suitable network component which is configured to communicate data to the network management platform 101 via a network protocol stack, corresponding protocol layer logs, or direct communication when identifying a traffic pattern by matching the data with information stored in database 103. In some embodiments, network node 105 is an evolved node B (eNB) in fourth generation (4G), a fifth generation (5G) logical node (gNB), a new radio (NR) base station, or other suitable node. In some embodiments, network management platform 101 comprises a set of computer readable instructions that, when executed by a processor such as a processor 303 (FIG. 3), causes network management platform 101 to perform the processes discussed in accordance with one or more embodiments. In some embodiments, network management platform 101 is remote from the network node 105 and the network device 107. In some embodiments, network management platform 101 is a part of one or more of the network node 105 or the network device 107. In some embodiments, one or more processes the network management platform 101 is configured to perform is divided among one or more of the network node 105 or the network device 107 and a processor remote from the network node 105 and/or the network device 107. In some embodiments, the network management platform 101 is at least partially implemented by a UE 109. In some embodiments, one or more processes the network management platform 101 is configured to perform is divided among one or more processors included in a single computing device or remote from one another, and/or divided among different sets of instructions executed by one or more processors that implement the network management platform 101.

In some embodiments, database 103 is a network marketplace, a network store, a net-store, or a centralized network repository having searchable information stored therein that includes traffic pattern matching data, rules defining various traffic patterns, network functions capable of being implemented in a given traffic pattern scenario involving one or more of communication network usage, timing, connected devices, location, network resource consumption, cost data, network KPI's, charge rates, or other suitable element or information upon which a traffic pattern is capable of being defined. Database 103 is a memory such as a memory 305 (FIG. 3) capable of being queried or caused to store data in accordance with one or more embodiments. In some embodiments, database 103 is representative or two or more databases and/or memory that capable of being queried or caused to store data in accordance with one or more embodiments.

In some embodiments, network management platform 101 identifies a corresponding network function by processing the data using a full length of internal logic and identified feature item or related support package in a target geographical area. In some embodiments, network management platform 101 is configured to cause one or more of a network node 105 or a network device 107 to store a segment of protocol logs and data indicative of a traffic pattern. In some embodiments, the segment is processed by a network node 105 or a network device to identify a network function or support package corresponding to a traffic pattern or KPI, and provide the network node 105, network device 107 or a user with information regarding the corresponding network function such as a name of the network function or support package, a process associated with implementing the network function or support package, one or more system requirements for implementing the network function or support package, permission to use the network function or support package, or other suitable information usable for improving communication network performance by enabling or disabling a network function of the support package. In some embodiments, network management platform 101 causes the network device 107 to communicate with a network node 105 via operations support systems (OSS) to fetch a current configuration of the network node 105 and prepare the support package based on the network function, system requirements, the traffic pattern, or intelligence data such as KPI's.

In some embodiments, network management platform 101 is configured to identify a network function related to a traffic pattern or KPI based on the third-generation partnership project (3GPP) protocols or similar protocol logs in a telecom network. A network node 105, for example, captures said protocol logs, counter information or a traffic pattern schema of live telecom traffic in the communication system. In this example, the network node 105 is a first entity to capture the protocol logs or traffic pattern using the 3GPP protocol stack, and extracts call process messages such as L1, L2, L3, non-access stratum (NAS) layer, telecom network intelligence messages, counter or KPI data, or other suitable protocol messages for a user defined time session or roll over period (ROP). The protocol logs are communicated to the network management platform 101 via open operation and maintenance (O&M) interfaces, for example, O-RAN interfaces, or other suitable interface for processing by the network management platform 101 and storage in database 103.

Network management platform 101 has internal logic instructions that, when executed, cause the network management platform 101 to process data received from the network node 105, in this example, to identify a "live" traffic scenario based on one or more UE 109's accessing the communication network and, identify a network function in the database 103 that is best suited to improve the performance of the communication network. In some embodiments, network management platform 101 correlates the identified traffic pattern and the identified network function and creates a support package for a target network node 105. In some embodiments, the support package is an enablement of the identified network function for a particular traffic pattern scenario. In some embodiments, the support package is a configuration of one or more network functions that are implemented by the target network node 105, for example. Network management platform 101 issues a command to enable the network function or launches the support package as a command to implement the one or more network functions in the target network node 105. The network node 105 then enables the network function or the one or more network functions based on the received command or configuration package and again starts to capture the protocol logs in accordance with user defined time session or ROP.

In use, the network management platform 101 orchestrates the communication network provided by communication system 100 by facilitating communications among one or more network devices 107 and/or one or more network nodes 105 having direct or indirect communicative connection with the management platform 101. Network management platform 101 receives data from a network node 105 and/or a network device 107 to determine whether a UE 109 is actively accessing the communication network. In some embodiments, the network management platform 101 receives data from a network device 107 to determine whether a UE 109 is actively accessing the communication network. In some embodiments, data is communicated from the network node 105 and/or the network device 107 to the network management platform 101 in real-time. Based on a determination that the UE 109 is actively accessing the communication network, network management platform 101 identifies a first traffic pattern associated with the communication network. Network management platform 101 searches database 103 for a first network function corresponding to the identified first traffic pattern. Network management platform 101 causes a first instruction to be sent to a network device 107 to activate the first network function based on the identified first traffic pattern. For example, if the network device 107 comprises a multiple-input-multiple-output (MIMO) antenna, and the identified first traffic pattern is defined by a rule in the database 103 as being one wherein the UE 109 is actively accessing the communication network and activating the MIMO is a network function corresponding to the first traffic pattern according to the information stored in database 103, the network management platform 101 causes the MIMO to be activated.

Network management platform 101 subsequently processes data received from the network node 105 and/or network device 107 to determine whether the communication network is still being accessed by the UE 109. If, at some point in time, the data received from network node 105 and/or network device 107 indicated that the communication network is no longer being accessed by the UE 109, then network management platform 101, based on the determination that the communication network us no longer being accessed by UE 109, identifies a second traffic pattern. Network management platform 101 then searches the database 103 for a second network function corresponding to the identified second traffic pattern and causes a second instruction to be sent to the network device 107 to deactivate the first network function and to activate the second network function based on the identified second traffic pattern. For example, if the network device 107 comprises the MIMO and a single antenna, the second network function causes the single antenna to be activated. Although in this example, the network function is caused to be activated by the network device 107, in some embodiments, the network function is optionally caused to be activated by the network node 105. In some embodiments, the network function is optionally caused to be activated by a combination of the network node 105 and the network device 107.

In some embodiments, network management platform 101 processes the data received from the network node 105 and/or the network device 107 to identify the first traffic pattern associated with the communication network and, in doing so, the network management platform 101 determines whether the data received from the network node 105 and/or the network device 107 is indicative of information within a predefined tolerance range of the first traffic pattern. Then, based on a determination that the first data is indicative of information within the predefined tolerance range, the network management platform 101 determines the first traffic pattern has occurred. For example, if the first traffic pattern is defined as occurring when a UE 109 is accessing the communication network between 11:00 AM and 2:00 PM, and the predefined tolerance range is set to be plus or minus five minutes if a second UE 109 is also accessing the communication network at the same time, then based on a determination that two UE 109's are accessing the communication network within the predefined tolerance of the time interval set for the first traffic pattern, the network management platform 101 determines that the data identifies the first traffic pattern has occurred. In some embodiments, the predefined tolerance is based on a combination of multiple variables or events that occur in a given order or within a predetermine time interval that might fall outside what is considered a perfect match for a rule defining a particular traffic pattern, but the network management platform 101 is configured to identify the traffic pattern as occurring if the actual traffic pattern is close enough as established by the tolerance and flexible combination of variables or events to facilitate improving communication network performance even when a perfect match for the particular traffic pattern has not exactly occurred.

Similarly, in some embodiments, if the database 103 does not have a network function that is assigned to an identifiable traffic pattern, or the database 103 does not have a network function assigned to a traffic pattern that precisely matches the traffic pattern that is actively occurring, the network management platform 101 is configured to identify a closest matching network function to be activated based on the network function that the network management platform 101 would cause to be activated for an otherwise identifiable traffic pattern that varies from the traffic pattern that is actively occurring based on the predefined tolerance.

In some embodiments, the first network function is a multiple input multiple output layer antenna port. In some embodiments, the first network function causes a MIMO antenna to be activated. In some embodiments, the second network function is a single-layer antenna port. In some embodiments, the second network function causes a single antenna to be activated. In some embodiments, the second network function is a default network function. In some embodiments, the first network function or the second network function is some other suitable function, service, rule, quantity limit, etc., capable of being turned on or off, expanded or minimized, or selectively provided with a predefined tolerance. For example, in a situation wherein the first traffic pattern is defined as an event occurring when a UE 109 is accessing the communication network between 11:00 AM and 2:00 PM, and two UE 109's are accessing the communication network at 10:45, the first traffic pattern has not yet occurred. But, if a third UE 109 is determined to be accessing the communication network at 10:50 AM, then the network management platform 101 activates a network function corresponding to a predetermined tolerance of plus or minus 5 minutes so that if at least one UE 109 is accessing the communication network, inclusive or exclusive of the three UE 109's accessing the communication network at 10:50 AM, the network management platform 101 determines the first traffic pattern is occurring at 10:55 AM causes the first network function corresponding to the first traffic pattern to be activated based on the flexibility implemented by the predefined tolerance being activated.

In some embodiments, network management platform 101 determines a time during which the UE 109 is actively accessing the communication network 101 and causes the first instruction to be sent to the network device 107 to activate the first network function based on a determination that the time the UE 109 is actively accessing the communication network 101 is within a time period defined in at least one rule associated with the first network function stored in the database 103. In some embodiments, the at least one rule is rigid and the time period defined in the rule hard bounded. In some embodiments, the at least one rule is somewhat flexible based on one or more of a predefined tolerance or a network function that activated a predefined tolerance.

In some embodiments, the first network function is a control plane overload control that limits a quantity of communication network connection requests within the time period.

In some embodiments, UE 109 is one of a plurality of UE 109's actively accessing the communication network 101, and the at least one rule defines a threshold value corresponding to an amount of physical resource block utilization and a quantity of the plurality of UE 109's actively accessing the communication network. The network management platform 101 causes the first instruction to be sent to the network device 107 to activate the first network function based on a determination that the first data indicates the amount of physical resource block utilization and the quantity of the plurality of UE 109's actively accessing the communication network exceeds the threshold value.

In some embodiments, the UE 109 is one of a plurality of UE 109's actively accessing the communication network, and the at least one rule defines a threshold value corresponding to a quantity of the plurality of UE 109's actively accessing the communication network within the time period. The network management platform 101 causes the first instruction to be sent to the network device 107 to activate the first network function based on a determination that the first data indicates the quantity of the plurality of UE 109's actively accessing the communication network exceeds the threshold value during the time period.

In some embodiments, the UE 109 is one of a plurality of UE 109's, and the at least one rule defines a threshold value corresponding to a quantity of the plurality of UE 109's attempting or requesting to access the communication network within a preset time period defined by the at least one rule. The network management platform 101 causes the first instruction to be sent to the network device 107 to activate the first network function based on a determination that the first data indicates the quantity of the plurality of UE 109's attempting to access the communication network exceeds the threshold value during the time period.

In some embodiments, the data received from the network node 105 and/or the network device 105 comprises device capability information corresponding to the UE 109 actively accessing the communication network. Network management platform 101 causes the first instruction to be sent to the network device 107 to activate the first network function based on a determination that the first data indicates the UE 109 is capable of utilizing the first network function.

In some embodiments, turning off the first network function and activating the second network function is a power saving process associated with the communication network.

In some embodiments, network management platform 101 processes data received from a network node 105 and/or the network device 107 to identify a first traffic pattern associated with the communication network. The first traffic pattern is an instance in which one or more UE 109's are one or more of actively accessing the communication network or requesting to access the communication network. Network management platform 101 causes a first instruction to be sent to a network device 107 to activate a first network function based on the identified first traffic pattern. Network management platform 101 then causes a network support package to be stored in the database 103. The network support package comprises criteria defining a perfect match for the first traffic pattern, a cross reference to the first network function. In some embodiments, the network support package further comprises at least one rule comprising a tolerance value or range based on which the first traffic pattern is identified outside of being a perfect match. The network management platform 101 processes second data received from the network node 105 and/or the network device 107 to identify a second traffic pattern associated with the communication network. In this example, the second traffic pattern is an instance in which one or more of a time, a quantity, or a location of the one or more UE 109's one or more of actively accessing the communication network or requesting to access the communication network is different from the first traffic pattern, and incapable of being determined to be the first traffic pattern based on the criteria defining the perfect match for the first traffic pattern and the at least one rule. Network management platform 101 then causes a second instruction to be sent to the network device 107 to deactivate the first network function based on the identified second traffic pattern. Subsequently, the network management platform 101 processes third data received from the network node 105 and/or the network device 109 to identify the first traffic pattern based on the at least one rule and causes a third instruction to be sent to the network device 107 to activate the first network function based on the first traffic pattern being identified based on the third data.

In some embodiments, the network support package is a first network support package among a plurality of network support packages stored in the database 103. Each network support package of the plurality of network support packages has criteria defining a corresponding traffic pattern, a cross reference to a different network function, and a corresponding rule comprising a tolerance value or range based on which the corresponding traffic pattern is identified outside of being a perfect match. The network management platform 101 causes the third instruction to be sent to the network device 107 based on a determination that the third data is closer to the first traffic pattern than to the traffic patterns corresponding to the other network support packages stored in the database 103. The determination that the third data is closer to the first traffic pattern than to the traffic patterns is based on the tolerance value or range indicated by the corresponding rule of each network support package.

By activating and deactivating various network functions based on traffic patterns and/or KPI's, the network management platform 101 makes it possible to save costs associated with operating a communication network, conserve network resources, manage cloud resources and/or minimize power consumption.

For example, in some embodiments, the network management platform 101 is configured to cause a 5G ENDC-MIMO layer to be turned on or off based on user availability, and/or to increase or reduce new radio (NR) physical resource block (PRB) utilization based on data received from the network node 105 and/or the network device 107 indicative of a NR capable UE 109 and a period of time. Initially, the network management platform 101 will turn-off the MIMO layer at a downlink based on data indicative of a traffic pattern wherein no UE 109 is actively accessing the communication network and/or no UE 109 having capabilities to utilize a network service associated with the 5G ENDC-MIMO Layer. A network node 105, such as an LTE eNB/5G gNB L3 detects a UE 109 accessing the communication network and detects capability information of the UE 109 such as "en-DC-r15 supported, supportedBandListEN-DC-r15". Based on this information ENDC capable MeNB (LTE) node will transfer said "No-Available" user for 5G-SCG present at this area. The LTE MeNB will collect this information for a preset period, e.g. 15 minutes ROP. The LTE node sends this information to the network management platform 101 as a sample to assess the situation. The network management platform 101 processes the data received from the LTE node to determine that the traffic pattern for "5G user" has reached to "0". Based on the determination that no 5G user is accessing the communication network, the network management platform 101 identifies a network function corresponding to the traffic pattern and prepares a "Feature Installation Package" to turn off the MIMO and configure an associated 5G node to turn off the MIMO layers and only transmit to a single antenna port. Then, when a 5G capable UE is detected as actively accessing the communication network, the network management platform 101 identifies such a traffic pattern and causes the MIMO layer to be turned on.

In some embodiments, network management platform 101 determines a closest match regarding which network function is to be activated for a traffic pattern that is not a perfect match for any previously identified traffic pattern or for available network functions in a given network. For example, for a traffic pattern in which a UE 109 accessing the communication is identified as "en-DC-r15 Supported", the network management platform 101 searches database 103 for a network function that is a closest match to that which would be applied if the available network functions were a perfect match, but in this case the network management platform 101 cannot find a perfect match in database 103, so the network management platform 101 causes whichever network function to be activated that can be optimally applied for the current network topology wherein the UE 109 is configured as indicated by the data received from the network node 105 and/or the network device 107.

As another example, in some embodiments, the network management platform 101 is configured to cause a reduction in the NR PRB utilization based on a quantity of NR capable UE 109's within a preset period of time. For example, the network management platform 101 is configured to cap a quantity of PRB utilization per UE 109 based on a network load and timing. With reference to operator deployment of a Sub-6 FR1 frequency, radio units have one oscillator only. Even if the network management platform 101 causes a 2×2 MIMO scheme to be enabled, for example, in such a scenario a minimum of 300W of power will be consumed by at least a portion of communication system 100 with no load condition. With a maximum load condition, the portion of the communication system 100 will consume 700W, where a maximum PRB 272 have a data session. In some embodiments, the network management platform 101 is configured to impose a cap on radio unit PRB utilization on non-peak hours 12:00 AM to 5:00 AM at 50% of 5G PRB allocation based on a quantity of active UE 109's accessing the communication network in the present time period. In other words, in this example, the identifiable traffic pattern is one wherein the quantity of UE 109's actively accessing the communication network is equal to or less than a predefined threshold quantity within the preset time interval, and the network function is one that limits the allocation of PRB's to 50%. The capability of turning on/off, or limiting a quantity of PRB utilization reduces power consumption and pushes the end user to utilize a maximum available LTE bandwidth for traffic. In some embodiments, network management platform 101 is configured to identify and apply appropriate network functions in real-time as-needed to optimize communication network performance while minimizing power consumption, in accordance with identified traffic patterns, rules and/or KPI's. In some embodiments, a network node 105 steers a user load based PRB mechanism to conserve power. In some embodiments, network node 105 is configured to prevent a UE 109 from using 100% PRB capacity at non-peak hours and to reduce power consumption and revert 100% PRB utilization as a quantity of UE 109's accessing the communication network increases to a predefined threshold.

In some embodiments, the network management platform 101 is configured to activate a network function associated with an eNodeB overload control based on an identified traffic pattern. A control plane overload control limits a quantity of connection requests such as RRC connection requests, HO requests, other suitable requests, or paging requests that an eNodeB has to process over a fixed period of time. For example, based on data communicated from the network node 105 to the network management platform 101 indicating paging-threshold/s1ap-ho-threshold/x2ap-ho-threshold/rrc-conxn-threshold, etc., the network management platform 101 limits the quantity of threshold requests to a number that is in accordance with at least one rule.

As another example, in some embodiments, the network management platform 101 is configured to activate a network function associated with a gNB overload control based on an identified traffic pattern. A control plane overload control, in this example, limits a quantity of connection requests such as RRC Connection requests, HO requests, other suitable requests, or paging requests that a gNB has to process over a fixed period of time. For example, based on data communicated from the network node 105 to the network management platform 101 indicating paging-threshold/ngap-ho-threshold/ngap-ho-threshold/rrc-conxn-threshold, etc., the network management platform 101 limits the quantity of threshold requests to a number that is in accordance with at least one rule.

As another example, in some embodiments, the network management platform 101 is configured to enable a network function associated with DL256QAM to decide a feature DL256QAM is needed and run only if a capable UE 109 is determined to be accessing the communication network based on data received from a network node 105 in accordance with information received by the network node 105 from the UE 109 reporting the capability to support this feature in a capability message. In some embodiments, capabilities regarding other network functions such as WIFI AP, IMS, 5G core network, or other suitable network features/execution/support capabilities are similarly reported by the UE 109 to the network node 105, and then to the network management platform 101 for processing and enablement or disablement of a network function based on the determined capabilities of the UE 109 actively accessing the communication network.

In some embodiments, network management platform 101 is configured to compile and process statistics regarding network function usage, network resource usage statistics, network usage, timing, connected devices, location, network resource consumption, cost data, network KPI's, or other suitable element or information associated with implementing a network function. In some embodiments, these statistics are used by the network management platform 101 as a basis for outputting one or more network operation reports that quantify network function usage, network resource usage, network operation efficiency based on network function usage and/or network resource usage with respect to one or more KPI's in a given period of time, for example, or with respect to a quantity of connected devices, location, cost, and/or other some other suitable metric.

In some embodiments, network management platform 101 outputs the one or more network operation reports to a graphical user interface output by a display for user consumption. In some embodiments, the user interface is output by way of a UE 101. In some embodiments, the user interface is output by way of a remote or fixed terminal associated with network management platform 101. In some embodiments, the graphical user interface includes one or more selectable options that correspond to features such as, but not limited to, setting a maximum charge rate, setting a minimum network performance level, setting a maximum network performance level, setting a balanced network performance level, setting available or allowable network functions, setting time periods within with one or more network functions are allowable for activation, setting one or more network element restrictions limiting usage of one or more network elements for implementing a network function, setting a maximum component charge rate associated with one or more network elements for implementing a network function, setting a time period within which one or more network elements for implementing a network function are limited from usage, and/or setting some other suitable option capable of being applied to affect network operation and/or cost.

In some embodiments, network management platform 101 determines a first network resource usage based on one or more of an amount of time the first network function is active or an amount of data transmitted by way of at least one of the network node 105 or UE 109. Network management platform 101 also causes a charge rate to be applied for using the first network function based on the first network resource usage. The charge rate is based, for example, on one or more factors such as a type of the first network function, a time of day the first network function is active, a quantity of mobile devices concurrently accessing the communication network while the first network function is active, a quantity of network devices concurrently activing the first network function, a quantity of network nodes concurrently activating the first network function, an amount of time the first network function is deactivated, a percentage of time the first network function is activate versus deactivated, cloud resource utilization, network bandwidth consumption, or some other suitable factor for identifying and applying a charge rate for using and/or activating a network function.

In some embodiments, the charge rate and one or more factors corresponding to the charge rate are stored in database 103. In some embodiments, the charge rate and the one or more factors corresponding to the charge rate stored in database 103 are capable of being edited by one or more users having authorized access to the database 103 to affect a charge rate applied for a particular traffic pattern, network function, network resource usage, etc., and/or one or more factors that are considered for determining the charge rate is to be applied for a given traffic pattern, network function, network resource usage scenario, etc. In some embodiments, one or more charge rates are capable of being added to or deleted from database 103 and/or one or more factors corresponding to existing charge rates and/or corresponding to new charge rates are capable of being added to or deleted from database 103 by users having authorized access to the database 103. In some embodiments, a user interface associated with editing, adding or deleting charge rates and/or factors corresponding to charge rates is viewable by way of a UE 101 to facilitate access to the database 103 by an authorized user and/or a fixed or remote terminal dedicated to one or more of database 103 or network management platform 101.

In some embodiments, the network management platform 101, based on the determined first network resource usage, queries the database 103 to determine the charge rate corresponding to the determined first network resource usage, the first traffic pattern, the first network function, the one or more factors corresponding to the charge rate, or some other suitable combination of information usable for honing in on an applicable charge rate.

In some embodiments, the network management platform 101 determines a maximum charge rate based on a user input, and network management platform 101 causes the first instruction for activating the first network function to be ignored based on the charge rate being greater than or equal to the maximum charge rate at a time the first traffic pattern is identified. Network management platform 101 further causes the second network function to be in an active state during the first traffic pattern based on the first instruction being ignored.

In some embodiments, the network management platform 101 determines a maximum charge rate based on a user input, and the network management platform 101 causes the second instruction to be sent to the network device to deactivate the first network function and to activate the second network function based on the charge rate being greater than or equal to the maximum charge rate during the first traffic pattern and before the second traffic pattern is identified.

In some embodiments, the network management platform 101 causes an invoice to be generated indicating a cost of using the first network function based on the charge rate applied for using the first network function and the first network resource usage. In some embodiments, the invoice further includes one or more of the statistics compiled and processed by network management platform 101 for user consumption.

In some embodiments, network management platform 101 causes the second instruction to be sent to the network device to deactivate the first network function and to activate the second network function based on the cost of using the first network function being greater than a predefined threshold value during the first traffic pattern and before the second traffic pattern is identified.

In some embodiments, the charge rate for using the first network function is based on one or more component charge rates associated with one or more corresponding network elements usable to implement the first network function. In some embodiments, network management platform 101 minimizes the cost of using the first network function by identifying and activating one or more network elements usable to implement the first network function having a lowest component charge rate among the one or more component charge rates. In some embodiments, network management platform 101 causes the one or more network elements activated to implement the first network function to be indicated on the invoice and/or in the network operation report.

In some embodiments, one or more of the network operation report or the invoice is generated based on first network resource usage in a first billing cycle, and the network management platform 101 processes a user selection to opt out of using one or more of the one or more network elements indicated in the network operation report and/or on the invoice to implement the first network function in a second billing cycle subsequent to the first billing cycle. Network management platform 101 then cause one or more other network elements to be activated to implement the first network function based on the first traffic pattern during the second billing cycle with the one or more other network elements being activated based on the user selection to opt out of using one or more of the one or more network elements.

In some embodiments, the charge rate for using the first network function is based on one or more component charge rates associated with one or more corresponding network elements usable to implement the first network function, and the network management platform 101 processes a user selection to maximize a performance indicator associated with the first network function or to minimize the charge rate for using the first network function. Network management platform 101 then causes one or more network elements to be activated to implement the first network function based on the user selection so as to activate the first network function while maximizing the performance indicator or minimizing the charge rate.

In some embodiments, the charge rate for using the first network function is based on one or more component charge rates associated with one or more corresponding network elements usable to implement the first network function, the network management platform 101 determines a maximum charge rate based on a user input, and the network management platform balances usage of one or more network elements to maximize a performance indicator associated with the first network function based on the maximum charge rate and the one or more component charge rates so as to implement the first network function with maximum performance without breaching a predefined threshold value of the maximum charge rate.

In some embodiments, the network management platform 101 facilitates one or more of tracking statistics, costs, options for maximizing a performance indicator, minimizing costs, balancing performance and cost, generating network operating reports, generating invoices, activation of the first network function, deactivation of the first network function, activation of the second network function, deactivation of the second network function to enable a pay-as-you-go-type functionality for communication system 100. Such capabilities provide for measuring and calculating network function and/or network resource usage, for example, to reduce network resource waste, reduce costs for operating the communication system 100, and maximize network performance based on real-time traffic patterns so that operators of the communication system 100 are not paying for network functions that are not necessary when a particular traffic pattern is not occurring. For example, if a network function associated with a given traffic pattern is more expensive to operate than a different network function that could otherwise be active when the given traffic pattern is not occurring, then the network management platform 101 avoids unnecessary activation of the more costly network function when the more costly network function is not necessary that moment. Accordingly, the pay-as-you-go-type functionality enables a network operation to pay for the more costly network function when that more costly function is needed, reducing costs of operating the communication network 100.

In some embodiments, the network management platform 101 provides an opportunity for a user to consider costs, power requirements, network performance metrics, etc., and select various options for minimizing costs and/or power consumption, maximizing or minimizing network performance, etc. In some embodiments, if network management platform 101 is caused to implement a selected operation level, for example, the management platform 101 helps to reduce power consumption by deactivating unnecessary network functions, and activating network functions as-need, which helps to reduce carbon emission associated with operation of the communication network 100.

Figure 2:
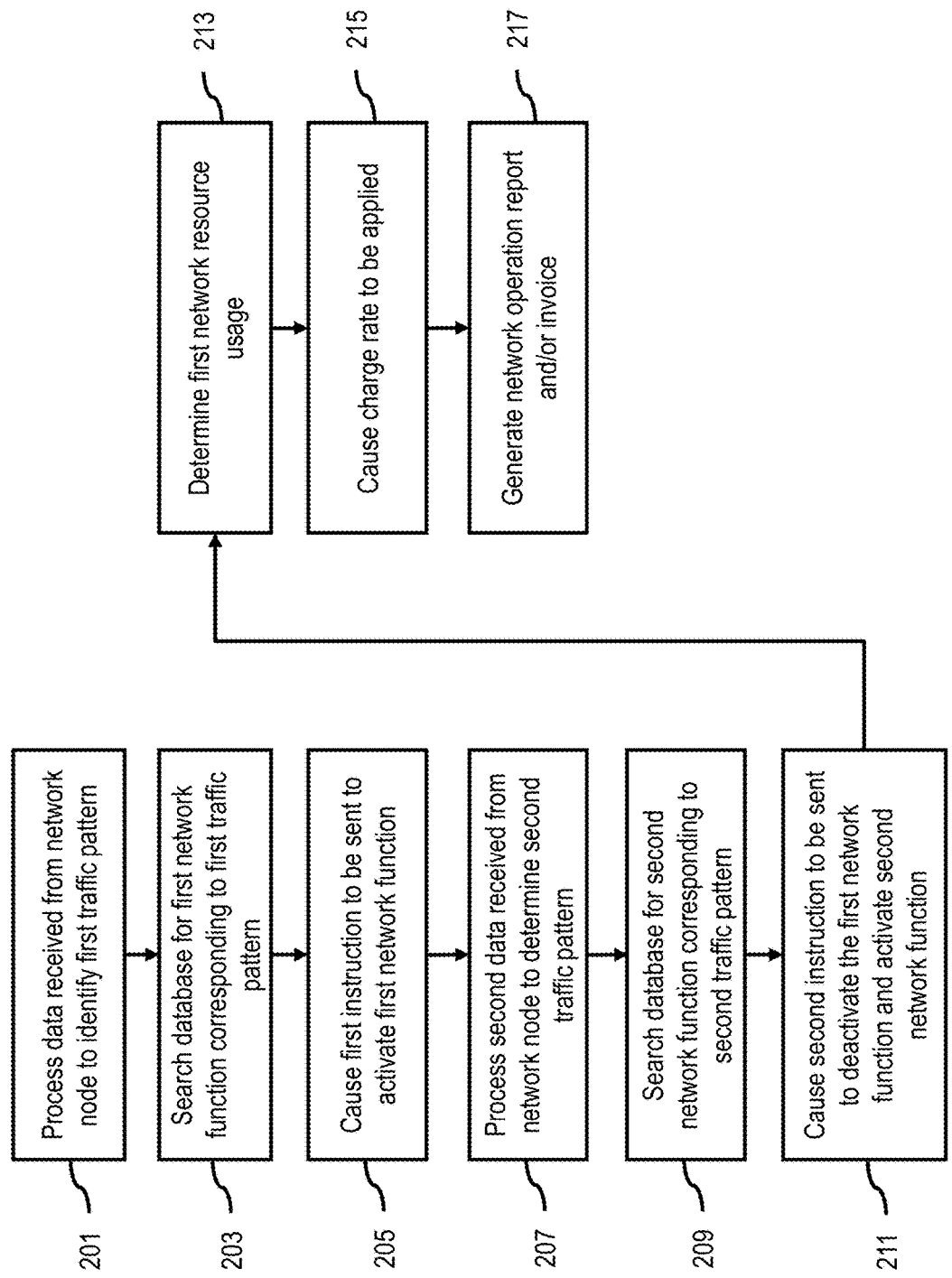
FIG. 2 is a flowchart of a process for learning various traffic patterns, implementing network functions to improve the performance of a communication network, and managing network resource usage for implementing one or more network functions, in accordance with one or more embodiments.

FIG. 2 is a flowchart of a process 200 learning various traffic patterns, implementing network functions to improve the performance of a communication network, and managing network resource usage for implementing one or more network functions, in accordance with one or more embodiments. In some embodiments, the network management platform 101 (FIG. 1) performs the process 200 and is implemented in or by, for instance, a chip set including a processor and a memory as shown in FIG. 3.

In step 201, first data received from a network node is processed to determine a mobile device is actively accessing a communication network and to identify a first traffic pattern associated with the communication network. In some embodiments, the processing of the first data to identify the first traffic pattern associated with the communication network comprises determining whether the first data is indicative of information within a predefined tolerance range of the first traffic pattern, and based on a determination that the first data is indicative of information within the predefined tolerance range, determining the first traffic pattern has occurred.

In step 203, a database is searched for a first network function corresponding to the identified first traffic pattern. In some embodiments, the first network function is a multiple input multiple output layer antenna port.

In step 205, a first instruction is caused to be sent to a network device to activate the first network function based on the identified first traffic pattern.

In step 207, second data received from the network node is processed to determine the communication network is no longer being accessed by the mobile device and to identify a second traffic pattern.

In step 209, the database is searched for a second network function corresponding to the identified second traffic pattern. In some embodiments, the second network function is a single-layer antenna port. In some embodiments, the second network function is a default network function.

In step 211, a second instruction is caused to be sent to the network device to deactivate the first network function and to activate the second network function based on the identified second traffic pattern.

In step 213, a first network resource usage is determined based on one or more of an amount of time the first network function is active or an amount of data transmitted by way of at least one of the network node or the mobile device.

In step 215, a charge rate is caused to be applied for using the first network function based on the network resource usage. The charge rate is based on one or more factors such as, for example, a type of the first network function, a time of day the first network function is active, a quantity of mobile devices concurrently accessing the communication network while the first network function is active, a quantity of network devices concurrently activing the first network function, or a quantity of network nodes concurrently activating the first network function, and/or some other suitable factor. The factors are processed and the database is searched to determine the applicable charge rate for using the first network function.

In step 217, one or more of a network operation report or an invoice is generated.

FIG. 3 is a functional block diagram of a computer or processor-based system 300 upon which or by which an embodiment is implemented.

Processor-based system 300 is programmed to learn various traffic patterns, implement network functions to improve the performance of a communication network, and manage network resource usage for implementing one or more network functions as described herein, and includes, for example, bus 301, processor 303, and memory 305 components.

In some embodiments, the processor-based system is implemented as a single "system on a chip." Processor-based system 300, or a portion thereof, constitutes a mechanism for performing one or more steps of learning various traffic patterns, implementing network functions to improve the performance of a communication network, and managing network resource usage for implementing one or more network functions.

In some embodiments, the processor-based system 300 includes a communication mechanism such as bus 301 for transferring information and/or instructions among the components of the processor-based system 300. Processor 303 is connected to the bus 301 to obtain instructions for execution and process information stored in, for example, the memory 305. In some embodiments, the processor 303 is also accompanied with one or more specialized components to perform certain processing functions and tasks such as one or more digital signal processors (DSP), or one or more application-specific integrated circuits (ASIC). A DSP typically is configured to process real-world signals (e.g., sound) in real time independently of the processor 303. Similarly, an ASIC is configurable to perform specialized functions not easily performed by a more general purpose processor. Other specialized components to aid in performing the functions described herein optionally include one or more field programmable gate arrays (FPGA), one or more controllers, or one or more other special-purpose computer chips.

In one or more embodiments, the processor (or multiple processors) 303 performs a set of operations on information as specified by a set of instructions stored in memory 305 related to learning various traffic patterns, implementing network functions to improve the performance of a communication network, and managing network resource usage for implementing one or more network functions. The execution of the instructions causes the processor to perform specified functions.

The processor 303 and accompanying components are connected to the memory 305 via the bus 301. The memory 305 includes one or more of dynamic memory (e.g., RAM, magnetic disk, writable optical disk, etc.) and static memory (e.g., ROM, CD-ROM, etc.) for storing executable instructions that when executed perform the steps described herein to learn various traffic patterns, implement network functions to improve the performance of a communication network, and manage network resource usage for implementing one or more network functions. The memory 305 also stores the data associated with or generated by the execution of the steps.

In one or more embodiments, the memory 305, such as a random access memory (RAM) or any other dynamic storage device, stores information including processor instructions for learning various traffic patterns, implementing network functions to improve the performance of a communication network, and managing network resource usage for implementing one or more network functions. Dynamic memory allows information stored therein to be changed. RAM allows a unit of information stored at a location called a memory address to be stored and retrieved independently of information at neighboring addresses. The memory 305 is also used by the processor 303 to store temporary values during execution of processor instructions. In various embodiments, the memory 305 is a read only memory (ROM) or any other static storage device coupled to the bus 301 for storing static information, including instructions, that is not capable of being changed by processor 303. Some memory is composed of volatile storage that loses the information stored thereon when power is lost. In some embodiments, the memory 305 is a non-volatile (persistent) storage device, such as a magnetic disk, optical disk or flash card, for storing information, including instructions, that persists even when the system 300 is turned off or otherwise loses power.

The term "computer-readable medium" as used herein refers to any medium that participates in providing information to processor 303, including instructions for execution. Such a medium takes many forms, including, but not limited to computer-readable storage medium (e.g., non-volatile media, volatile media). Non-volatile media includes, for example, optical or magnetic disks. Volatile media include, for example, dynamic memory. Common forms of computer-readable media include, for example, a floppy disk, a flexible disk, a hard disk, a magnetic tape, another magnetic medium, a CD-ROM, CDRW, DVD, another optical medium, punch cards, paper tape, optical mark sheets, another physical medium with patterns of holes or other optically recognizable indicia, a RAM, a PROM, an EPROM, a FLASH-EPROM, an EEPROM, a flash memory, another memory chip or cartridge, or another medium from which a computer can read. The term computer-readable storage medium is used herein to refer to a computer-readable medium.

An aspect of this description is directed to a method comprising processing first data received from a network node to determine a mobile device is actively accessing a communication network and to identify a first traffic pattern associated with the communication network. The method also comprises searching a database for a first network function corresponding to the identified first traffic pattern. The method further comprises causing a first instruction to be sent to a network device to activate the first network function based on the identified first traffic pattern. The method additionally comprises processing, by the processor, second data received from the network node to determine the communication network is no longer being accessed by the mobile device and to identify a second traffic pattern. The method also comprises searching the database for a second network function corresponding to the identified second traffic pattern. The method further comprises causing a second instruction to be sent to the network device to deactivate the first network function and to activate the second network function based on the identified second traffic pattern. The method additionally comprises determining a first network resource usage based on one or more of an amount of time the first network function is active or an amount of data transmitted by way of at least one of the network node or the mobile device. The method also comprises causing a charge rate to be applied for using the first network function based on the first network resource usage. The charge rate is based on one or more of a type of the first network function, a time of day the first network function is active, a quantity of mobile devices concurrently accessing the communication network while the first network function is active, a quantity of network devices concurrently activing the first network function, or a quantity of network nodes concurrently activating the first network function.

In another aspect, an apparatus, comprises a processor and a memory having instructions stored thereon that, when executed by the processor, cause the apparatus to process first data received from a network node to determine a mobile device is actively accessing a communication network and to identify a first traffic pattern associated with the communication network. The apparatus is also caused to search a database for a first network function corresponding to the identified first traffic pattern. The apparatus is further caused to cause a first instruction to be sent to a network device to activate the first network function based on the identified first traffic pattern. The apparatus is additionally caused to process second data received from the network node to determine the communication network is no longer being accessed by the mobile device and identify a second traffic pattern. The apparatus is also caused to search the database for a second network function corresponding to the identified second traffic pattern. The apparatus is further caused to cause a second instruction to be sent to the network device to deactivate the first network function and to activate the second network function based on the identified second traffic pattern. The apparatus is additionally caused to determine a first network resource usage based on one or more of an amount of time the first network function is active or an amount of data transmitted by way of at least one of the network node or the mobile device. The apparatus is also caused to cause a charge rate to be applied for using the first network function based on the first network resource usage. The charge rate is based on one or more of a type of the first network function, a time of day the first network function is active, a quantity of mobile devices concurrently accessing the communication network while the first network function is active, a quantity of network devices concurrently activing the first network function, or a quantity of network nodes concurrently activating the first network function.

In another aspect, a computer readable medium has instructions stored thereon that, when executed by a processor, cause an apparatus to process first data received from a network node to determine a mobile device is actively accessing a communication network and to identify a first traffic pattern associated with the communication network. The apparatus is also caused to search a database for a first network function corresponding to the identified first traffic pattern. The apparatus is further caused to cause a first instruction to be sent to a network device to activate the first network function based on the identified first traffic pattern. The apparatus is additionally caused to process second data received from the network node to determine the communication network is no longer being accessed by the mobile device and identify a second traffic pattern. The apparatus is also caused to search the database for a second network function corresponding to the identified second traffic pattern. The apparatus is further caused to cause a second instruction to be sent to the network device to deactivate the first network function and to activate the second network function based on the identified second traffic pattern. The apparatus is additionally caused to determine a first network resource usage based on one or more of an amount of time the first network function is active or an amount of data transmitted by way of at least one of the network node or the mobile device. The apparatus is also caused to cause a charge rate to be applied for using the first network function based on the first network resource usage. The charge rate is based on one or more of a type of the first network function, a time of day the first network function is active, a quantity of mobile devices concurrently accessing the communication network while the first network function is active, a quantity of network devices concurrently activating the first network function, or a quantity of network nodes concurrently activating the first network function.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method, comprising:
   processing, by a processor, first data received from a network node to determine a mobile device is actively accessing a communication network and to identify a first traffic pattern associated with the communication network;
   searching a database for a first network function corresponding to the identified first traffic pattern;
   causing a first instruction to be sent to a network device to activate the first network function based on the identified first traffic pattern;
   processing, by the processor, second data received from the network node to determine the communication network is no longer being accessed by the mobile device and to identify a second traffic pattern;
   searching the database for a second network function corresponding to the identified second traffic pattern;
   causing a second instruction to be sent to the network device to deactivate the first network function and to activate the second network function based on the identified second traffic pattern;
   determining a first network resource usage based on one or more of an amount of time the first network function is active or an amount of data transmitted by way of at least one of the network node or the mobile device;

causing a charge rate to be applied for using the first network function based on the first network resource usage;

determining a cost of using the first network function based on the charge rate applied for using the first network function and the first network resource usage; and causing the second instruction to be sent to the network device to deactivate the first network function and to activate the second network function based on the cost of using the first network function being greater than a predefined threshold value during the first traffic pattern and before the second traffic pattern is identified, wherein the charge rate is based on one or more of a quantity of mobile devices concurrently accessing the communication network while the first network function is active, a quantity of network devices concurrently activating the first network function, or a quantity of network nodes concurrently activating the first network function.

2. The method of claim 1, further comprising:
determining a time during which the mobile device is actively accessing the communication network and the causing of the first instruction to be sent to the network device to activate the first network function is further based on a determination that the time the mobile device is actively accessing the communication network is within a time period defined in at least one rule associated with the first network function stored in the database.

3. The method of claim 2, wherein the mobile device is a first mobile device of a plurality of mobile devices actively accessing the communication network, the at least one rule further defines a threshold value corresponding to an amount of physical resource block utilization and a quantity of the plurality of mobile devices actively accessing the communication network, and the causing of the first instruction to be sent to the network device to activate the first network function is further based on a determination that the first data indicates the amount of physical resource block utilization and the quantity of the plurality of mobile devices actively accessing the communication network exceeds the threshold value.

4. The method of claim 2, wherein the mobile device is a first mobile device of a plurality of mobile devices actively accessing the communication network, the at least one rule further defines a threshold value corresponding to a quantity of the plurality of mobile devices actively accessing the communication network within the time period, and the causing of the first instruction to be sent to the network device to activate the first network function is further based on a determination that the first data indicates the quantity of the plurality of mobile devices actively accessing the communication network exceeds the threshold value during the time period.

5. The method of claim 1, further comprising:
determining a maximum charge rate based on a user input;
causing the first instruction to be ignored based on the charge rate being greater than or equal to the maximum charge rate at a time the first traffic pattern is identified; and
causing the second network function to be in an active state during the first traffic pattern based on the first instruction being ignored.

6. The method of claim 1, further comprising:
determining a maximum charge rate based on a user input; and
causing the second instruction to be sent to the network device to deactivate the first network function and to activate the second network function based on the charge rate being greater than or equal to the maximum charge rate during the first traffic pattern and before the second traffic pattern is identified.

7. The method of claim 1, wherein the charge rate for using the first network function is based on one or more component charge rates associated with one or more corresponding network elements usable to implement the first network function, and the method further comprises:
processing a user selection to maximize a performance indicator associated with the first network function or to minimize the charge rate for using the first network function; and
causing one or more network elements to be activated to implement the first network function based on the user selection so as to activate the first network function while maximizing the performance indicator or minimizing the charge rate.

8. The method of claim 1, wherein the charge rate for using the first network function is based on one or more component charge rates associated with one or more corresponding network elements usable to implement the first network function, and the method further comprises:
determining a maximum charge rate based on a user input; and
balancing usage of one or more network elements to maximize a performance indicator associated with the first network function based on the maximum charge rate and the one or more component charge rates so as to implement the first network function with maximum performance without breaching a predefined threshold value of the maximum charge rate.

9. The method of claim 1, wherein the processing of the first data to identify the first traffic pattern associated with the communication network comprises determining whether the first data is indicative of information within a predefined tolerance range of the first traffic pattern, and based on a determination that the first data is indicative of information within the predefined tolerance range, determining the first traffic pattern has occurred.

10. The method of claim 1, wherein the charge rate for using the first network function is based on one or more component charge rates associated with one or more corresponding network elements usable to implement the first network function, and the method further comprises:
minimizing the cost of using the first network function by identifying and activating one or more network elements usable to implement the first network function having a lowest component charge rate among the one or more component charge rates.

11. A method, comprising:
processing, by a processor, first data received from a network node to determine a mobile device is actively accessing a communication network and to identify a first traffic pattern associated with the communication network;
searching a database for a first network function corresponding to the identified first traffic pattern;
causing a first instruction to be sent to a network device to activate the first network function based on the identified first traffic pattern;
processing, by the processor, second data received from the network node to determine the communication network is no longer being accessed by the mobile device and to identify a second traffic pattern;
searching the database for a second network function corresponding to the identified second traffic pattern;
causing a second instruction to be sent to the network device to deactivate the first network function and to activate the second network function based on the identified second traffic pattern;
determining a first network resource usage based on one or more of an amount of time the first network function is active or an amount of data transmitted by way of at least one of the network node or the mobile device;
causing a charge rate to be applied for using the first network function based on the first network resource usage;
causing an invoice to be generated indicating a cost of using the first network function based on the charge rate applied for using the first network function and the first network resource usage; and
causing the second instruction to be sent to the network device to deactivate the first network function and to activate the second network function based on the cost of using the first network function being greater than a predefined threshold value during the first traffic pattern and before the second traffic pattern is identified,
wherein the charge rate is based on one or more of a quantity of mobile devices concurrently accessing the communication network while the first network function is active, a quantity of network devices concurrently activating the first network function, or a quantity of network nodes concurrently activating the first network function.

12. The method of claim 11, wherein the charge rate for using the first network function is based on one or more component charge rates associated with one or more corresponding network elements usable to implement the first network function, and the method further comprises:
minimizing the cost of using the first network function by identifying and activating one or more network elements usable to implement the first network function having a lowest component charge rate among the one or more component charge rates.

13. The method of claim 12, further comprising:
causing the one or more network elements activated to implement the first network function to be indicated on the invoice.

14. The method of claim 13, wherein the invoice is generated based on first network resource usage in a first billing cycle, and the method further comprises:
processing a user selection to opt out of using one or more of the one or more network elements indicated on the invoice to implement the first network function in a second billing cycle subsequent to the first billing cycle; and
causing one or more other network elements to be activated to implement the first network function based on the first traffic pattern during the second billing cycle, the one or more other network elements being activated based on the user selection to opt out of using one or more of the one or more network elements.

15. An apparatus, comprising:
a processor; and
a memory having computer readable instructions stored thereon that, when executed by the processor, cause the apparatus to:
process first data received from a network node to determine a mobile device is actively accessing a communication network and to identify a first traffic pattern associated with the communication network;
search a database for a first network function corresponding to the identified first traffic pattern;
cause a first instruction to be sent to a network device to activate the first network function based on the identified first traffic pattern;
process second data received from the network node to determine the communication network is no longer being accessed by the mobile device and to identify a second traffic pattern;
search the database for a second network function corresponding to the identified second traffic pattern;
cause a second instruction to be sent to the network device to deactivate the first network function and to activate the second network function based on the identified second traffic pattern;
determine a first network resource usage based on one or more of an amount of time the first network function is active or an amount of data transmitted by way of at least one of the network node or the mobile device;
cause a charge rate to be applied for using the first network function based on the first network resource usage;
determining a cost of using the first network function based on the charge rate applied for using the first network function and the first network resource usage; and
causing the second instruction to be sent to the network device to deactivate the first network function and to activate the second network function based on the cost of using the first network function being greater than a predefined threshold value during the first traffic pattern and before the second traffic pattern is identified,
wherein the charge rate is based on one or more of a quantity of mobile devices concurrently accessing the communication network while the first network function is active, a quantity of network devices concurrently activating the first network function, or a quantity of network nodes concurrently activating the first network function.

16. The apparatus of claim 15, wherein the apparatus is further caused to:
cause an invoice to be generated indicating the cost of using the first network function based on the charge rate applied for using the first network function and the first network resource usage.

17. The apparatus of claim 16, wherein the charge rate for using the first network function is based on one or more component charge rates associated with one or more corresponding network elements usable to implement the first network function, and the apparatus is further caused to:
minimize the cost of using the first network function by identifying and activating one or more network elements usable to implement the first network function having a lowest component charge rate among the one or more component charge rates; and
cause the one or more network elements activated to implement the first network function to be indicated on the invoice.

18. The apparatus of claim 15, wherein the apparatus is further caused to:
determine a maximum charge rate based on a user input;
cause the first instruction to be ignored based on the charge rate being greater than or equal to the maximum charge rate at a time the first traffic pattern is identified; and cause the second network function to be in an active state during the first traffic pattern based on the first instruction being ignored.

19. The apparatus of claim 15, wherein the apparatus is further caused to:
    determine a maximum charge rate based on a user input; and
    cause the second instruction to be sent to the network device to deactivate the first network function and to activate the second network function based on the charge rate being greater than or equal to the maximum charge rate during the first traffic pattern and before the second traffic pattern is identified.

20. The apparatus of claim 15, wherein the charge rate for using the first network function is based on one or more component charge rates associated with one or more corresponding network elements usable to implement the first network function, and the apparatus is further caused to:
    minimize the cost of using the first network function by identifying and activating one or more network elements usable to implement the first network function having a lowest component charge rate among the one or more component charge rates.

* * * * *